June 30, 1931.  C. E. CARROLL  1,812,137
ARRANGEMENT OF WINDMILLS
Filed July 13, 1922
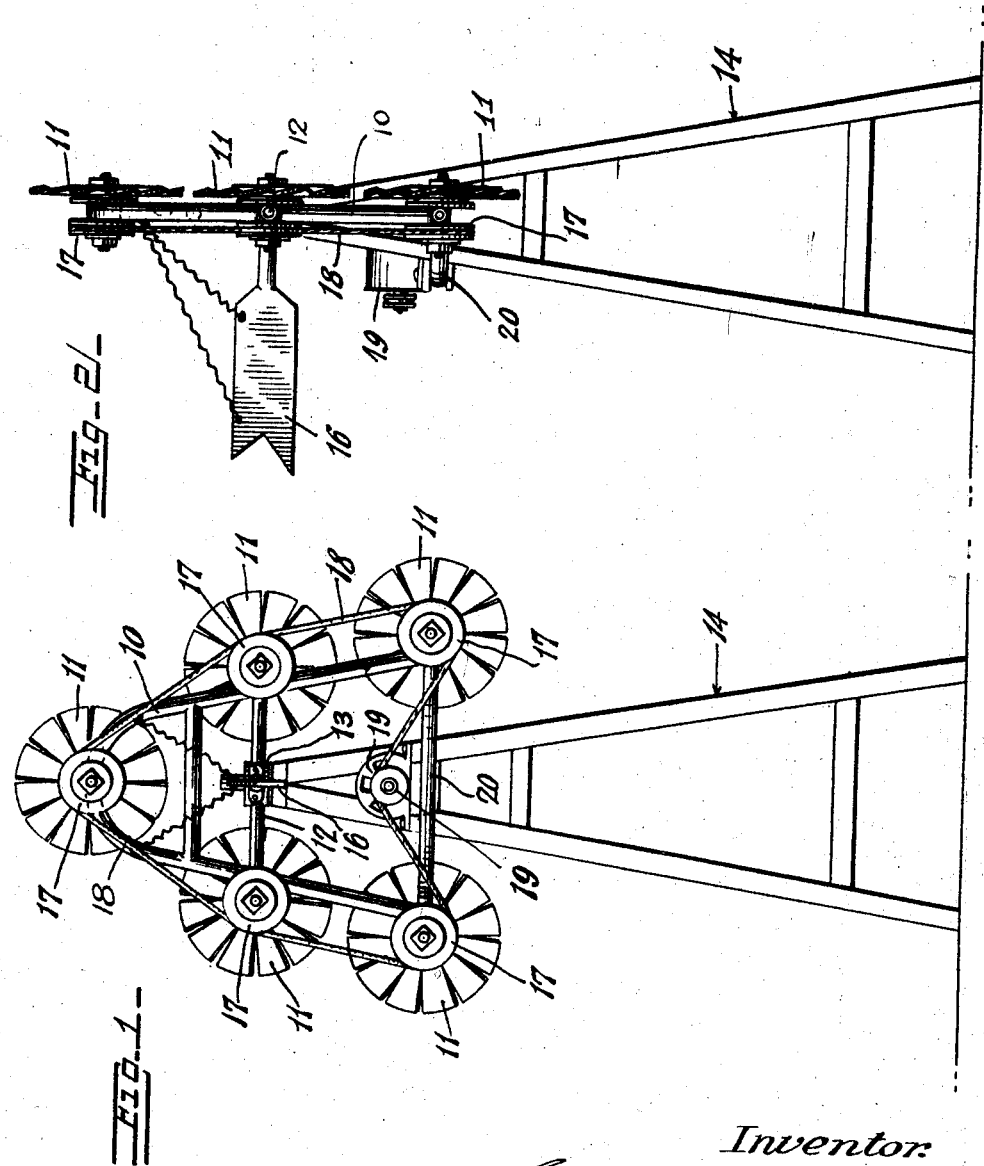
Inventor:
Charles E. Carroll
by Chas. J. Williamson,
Atty.

Patented June 30, 1931

1,812,137

UNITED STATES PATENT OFFICE

CHARLES EDWARD CARROLL, OF NEWPORT, ARKANSAS

ARRANGEMENT OF WINDMILLS

Application filed July 13, 1922. Serial No. 574,817.

My invention is aimed to provide an efficient and otherwise satisfactory mechanism for utilizing the power of wind and particularly adapted for the generation of electricity and my invention consists in whatever is described by or is included within the terms or scope of the appended claims.

In the accompanying drawings:

Fig. 1 is an elevation from the rear of a satisfactory embodiment of my invention;

Fig. 2 is a side view thereof.

Briefly described my invention is embodied in a structure that has a frame-work which supports a plurality of wind wheels and a dynamo, the frame-work and all it supports being mounted upon a suitable tower or support so that it may rotate on a vertical axis to present the wind wheels to the wind and about a horizontal axis to permit the wind wheels under dangerously high winds to tilt more or less out of the wind.

Referring in detail to what is shown in the drawings the frame-work, 10, in the form of an inverted U, has bearings for a plurality of wind wheels, 11, arranged in a symmetrical group and all standing in the same vertical plane when the mechanism is operated under normal conditions, there being a central wheel at the top and two wheels on either side one below the other and the framework has a horizontal bar, 12, which is supported by the turntable, 13, on the top of the tower, 14, so that the center of gravity of the framework and wheels will be below the point of support and said horizontal bar, 12, being a horizontal axis upon which the frame-work and its group of wheels may swing horizontally so as to throw the wind wheels into a more or less horizontal position under high winds that might blow the structure over. The area of the wheels below the cross bar, 12, is greater than the area of the wheels above so that the lower portion of the structure under high winds swings upward. Besides movement on the horizontal axis the framework may move about a vertical axis, 15, passing through the turntable, 13, so that the wheels may present themselves to the wind according to its direction and a tail or vane, 16, is provided as is customary in wind mills so as to properly position the wheels in the wind, said vane being supported so that it always extends horizontally.

Each wind wheel has a sprocket gear, 17, for engagement by a sprocket chain, 18, which either directly or indirectly may drive the dynamo, 19, which is mounted upon a horizontal bottom bar, 20, of the framework, 10, so that the dynamo moves with the framework, the bottom bar, 20, being curved so as to clear the tower and permit the turning of the framework upon its vertical axis.

It will be understood that suitable brake mechanism, and shunt or safety switches for the battery, if one be used to store the current generated by the motor, will be used but as my invention is not concerned with these particular devices and they can be such as are commonly used I do not consider it necessary to show the same in the drawings.

What I claim is:

1. The combination of a suitable support, a group of wind wheels mounted thereon and a common means for taking power from the wheels of the group comprising sprocket gearing that includes sprocket wheels on the windwheel shafts and a sprocket chain passing over such sprocket wheels and means also mounted on said frame work to which the power is delivered having a wheel over which said sprocket chain passes.

2. The combination of a suitable support, a group of wind wheels, a frame work for such wheels mounted on such support with the center of gravity below the point of support and a dynamo mounted on said frame work in driving connection with the wind wheels.

CHARLES EDWARD CARROLL.